US012785087B2

(12) United States Patent
Liu et al.

(10) Patent No.: US 12,785,087 B2
(45) Date of Patent: Nov. 3, 2026

(54) ELECTROCHEMICAL DEVICE AND ELECTRONIC DEVICE

(71) Applicant: Ningde Amperex Technology Limited, Ningde (CN)

(72) Inventors: Shengqi Liu, Ningde (CN); Xiaohu Cai, Ningde (CN); Kefei Wang, Ningde (CN); Qingwen Zhang, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 568 days.

(21) Appl. No.: 18/454,363

(22) Filed: Aug. 23, 2023

(65) Prior Publication Data

US 2023/0395787 A1 Dec. 7, 2023

Related U.S. Application Data

(63) Continuation of application No. PCT/CN2021/077397, filed on Feb. 23, 2021.

(51) Int. Cl.

*H01M 4/36* (2006.01)
*H01M 4/02* (2006.01)
*H01M 10/0525* (2010.01)

(52) U.S. Cl.

CPC ....... *H01M 4/366* (2013.01); *H01M 10/0525* (2013.01); *H01M 2004/021* (2013.01); *H01M 2004/028* (2013.01)

(58) Field of Classification Search

CPC ............. H01M 4/366; H01M 10/0525; H01M 2004/021; H01M 2004/028

See application file for complete search history.

(56) References Cited

U.S. PATENT DOCUMENTS

2013/0330598 A1 12/2013 Shim et al.
2014/0079872 A1* 3/2014 Uchida ............... H01M 4/0404 427/58

(Continued)

FOREIGN PATENT DOCUMENTS

CN 102738466 A * 10/2012 ............ H01M 4/621
CN 103367710 A 10/2013

(Continued)

OTHER PUBLICATIONS

Machine Translation of CN-102738466-A (Jun. 17, 2026) (Year: 2026).*

(Continued)

*Primary Examiner* — Matthew J Merkling
(74) *Attorney, Agent, or Firm* — Maier & Maier, PLLC

(57) ABSTRACT

An electrochemical device includes a positive electrode, the positive electrode includes a current collector and a film layer containing a positive active material. The film layer is disposed on at least one surface of the current collector. The positive active material includes a primary particle and/or a secondary particle. When a mass percent A of the primary particle in the positive active material based on a mass of the positive active material satisfies 20%≤A≤100%, the film layer, the positive active material, and the current collector satisfy: $D_l \geq Dv_{99} - D_c$; and, when a mass percent A' of the primary particle in the positive active material based on the mass of the positive active material satisfies 0≤A'≤20%, the film layer, the positive active material, and the current collector satisfy: $D_l \geq 1.1\ Dv_{99}$.

19 Claims, 1 Drawing Sheet

(56) References Cited

U.S. PATENT DOCUMENTS

| | | | | |
|---|---|---|---|---|
| 2016/0087280 | A1 * | 3/2016 | Toyama | H01M 4/661 429/233 |
| 2016/0315312 | A1 | 10/2016 | Tamura et al. | |
| 2020/0099103 | A1 * | 3/2020 | Wang | H01M 10/0567 |
| 2020/0381727 | A1 * | 12/2020 | Kumakura | H01M 4/525 |

FOREIGN PATENT DOCUMENTS

| | | | | |
|---|---|---|---|---|
| CN | 109301322 | A * | 2/2019 | H01M 4/13 |
| CN | 109428076 | A | 3/2019 | |
| CN | 111063883 | A | 4/2020 | |
| CN | 111630002 | A | 9/2020 | |
| CN | 111916665 | A | 11/2020 | |
| CN | 112072068 | A | 12/2020 | |
| JP | 2017183236 | A | 10/2017 | |
| JP | 2018056054 | A | 4/2018 | |
| KR | 1020150099219 | A | 8/2015 | |

OTHER PUBLICATIONS

Extended Search Report issued on May 27, 2025, in corresponding European Application No. 21927103.8, 13 pages.

Office Action issued on Apr. 16, 2025, in corresponding Chinese Application No. 202211142103.2, 14 pages.

International Search Report and Written Opinion issued on Jul. 5, 2021 in corresponding application No. PCT/CN2021/077397; 11 pages.

Chinese Office Action issued on Dec. 23, 2021, in corresponding application No. 202180001858.8; 15 pages.

* cited by examiner

ELECTROCHEMICAL DEVICE AND ELECTRONIC DEVICE

CROSS REFERENCE TO THE RELATED APPLICATIONS

This application is a continuation under 35 U.S.C. § 120 of international patent application PCT/CN2021/077397 filed on Feb. 23, 2021, the entire content of which is incorporated herein by reference.

TECHNICAL FIELD

This application relates to an electrochemical device and an electronic device.

BACKGROUND

Electrochemical devices, such as a lithium-ion battery, are characterized by a high energy density, a low maintenance cost, a low self-discharge rate, a wide range of working temperatures, a long cycle life, no memory effect, a stable working voltage, environmental friendliness, and the like, and therefore, are widely used in the fields such as smart products (including electronic products such as a mobile phone, a laptop computer, and a camera), electric tools, and electric vehicles. With the rapid development of technology and the diversity of market demand, people have imposed higher requirements on the performance of the electrochemical devices, such as fast-charge performance.

However, the fast-charge performance of lithium-ion batteries is improved by compromising other performance indicators of lithium-ion batteries, such as storage performance and cycle performance. Therefore, there is an urgent need for a technical solution that improves the fast-charge performance of lithium-ion batteries without compromising the storage performance and cycle performance.

SUMMARY

In some embodiments, this application provides an electrochemical device, including a positive electrode. The positive electrode includes a current collector and a film layer containing a positive active material. The film layer is disposed on at least one surface of the current collector. The positive active material includes a primary particle and/or a secondary particle. When a mass percent A of the primary particle in the positive active material based on a mass of the positive active material satisfies $20\% \le A \le 100\%$, the film layer, the positive active material, and the current collector satisfy: $D_l \ge Dv_{99} - D_c$; and, when a mass percent A' of the primary particle in the positive active material based on the mass of the positive active material satisfies $0 \le A' \le 20\%$, the film layer, the positive active material, and the current collector satisfy: $D_l \ge 1.1\ Dv_{99}$. $D_l$ is a thickness of the film layer, $D_c$ is a thickness of the current collector, and $D_{v99}$ is a diameter of particles of the positive active material corresponding to a point at which a cumulative volume percentage of measured particles reaches 99% of a total volume of all sample particles in a volume-based particle size distribution curve viewed from a small-diameter side.

In some embodiments, a relationship between the thickness $D_l$ of the film layer and the thickness $D_c$ of the current collector satisfies: $0.05 \le D_l/D_c \le 3.75$.

In some embodiments, the thickness $D_l$ of the film layer is 1 μm to 30 μm.

In some embodiments, the thickness $D_c$ of the current collector is 4 μm to 20 μm.

In some embodiments, the particle diameter $D_{v99}$ of the positive active material is 5 μm to 48 μm.

In some embodiments, a compaction density of the film layer is 2 g/dm$^3$ to 4.3 g/dm$^3$.

In some embodiments, the current collector includes a blank region and a covered region. The blank region is a region not covered with the film layer on the current collector. A roughness of the blank region is 500 mm$^{-1}$ to 2000 mm$^{-1}$. The covered region is a region covered with the film layer on the current collector. A roughness of the covered region is 1500 mm$^{-1}$ to 8000 mm$^{-1}$.

In some embodiments, the electrochemical device further includes an electrolyte solution. The electrolyte solution includes an ether dinitrile compound. Based on a total mass of the electrolyte solution, a mass percent of the ether dinitrile compound is 0.01 wt % to 15 wt %.

In some embodiments, a conductivity of the electrolyte solution is greater than or equal to 7 mS/cm.

In some embodiments, this application further provides an electronic device. The electronic device includes the electrochemical device of this application.

The technical solution of this application achieves at least the following beneficial effects: This application manipulates different structural characteristics of both primary particles and secondary particles, and arranges the size design of the positive film layer, the positive active material, and the positive current collector to satisfy a specified relationship. When applied to a fast-charge battery, such materials can maximally avoid hazards during the use of fast-charge battery, make the particles not prone to be crushed during cold-pressing, and improve the appearance of the electrode plate while achieving desirable fast-charge performance, storage performance, and cycle performance.

Figure 1:
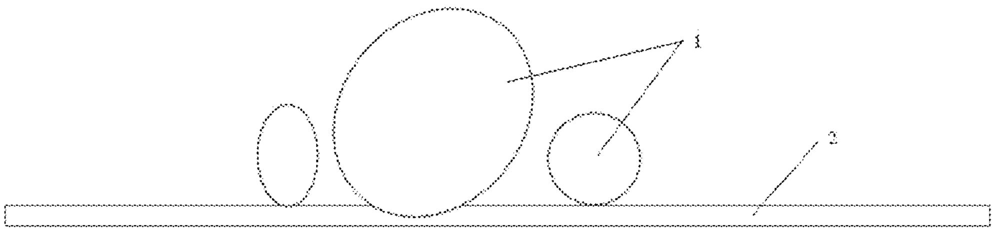
FIG. 1 is a schematic diagram of a positional relationship between primary particles and a current collector after cold-pressing when a positive active material is the primary particles.

List of reference numerals: 1—positive active material particles, 2—positive current collector.

DETAILED DESCRIPTION

Exemplary embodiments of this application are described thoroughly below in detail. However, the exemplary embodiments may be implemented in different manners, and this application is not to be construed as being limited to the embodiments described herein. Rather, such embodiments are intended to describe this application thoroughly and comprehensively, and impart the scope of this application sufficiently to those skilled in the art.

Electrochemical Device

The electrochemical device according to this application is, for example, a primary battery, a secondary battery, a fuel battery, a solar battery, or a capacitor. The secondary battery is, for example, a lithium secondary battery. The lithium secondary battery includes but is not limited to a lithium metal secondary battery, a lithium-ion secondary battery, a lithium polymer secondary battery, or a lithium-ion polymer secondary battery.

In some embodiments, the electrochemical device includes a positive electrode, a negative electrode, and a separator.

[Positive Electrode]

The positive electrode includes a positive current collector and a positive film layer. The positive film layer is disposed on at least one surface of the positive current collector. The positive film layer contains a positive active material. The positive active material includes a primary particle and/or a secondary particle.

In this application, the term "primary particle" is an active material particle of a single grain. Two or more primary particles may aggregate to form a secondary particle. In some embodiments, the primary particle may be in any one of a variety of shapes, including a rod shape, a rectangle, or a combination thereof. The term "secondary particle" means a particle formed by aggregating two or more primary particles and not to be further aggregated with other particles. The primary particle and the secondary particle assume distinct structural characteristics independently. In this application, the primary particle may be obtained by over-sintering relatively small particles, and the secondary particle may be obtained by agglomerating primary particles.

In some embodiments, the positive active material includes primary particles. The mass percent of the primary particles in the positive active material is 100%. The relationship between the positive film layer, the positive active material, and the positive current collector satisfies: $D_l \geq Dv_{99} - D_c$, where $D_l$ is a thickness of the positive film layer, $D_c$ is a thickness of the positive current collector, and $D_{v99}$ is a diameter of particles of the positive active material corresponding to a point at which a cumulative volume percentage of measured particles reaches 99% of a total volume of all sample particles in a volume-based particle size distribution curve viewed from a small-diameter side.

As shown in FIG. 1, the primary particle is a positive active material particle 1 of a single crystal grain, and is generally in the shape of a non-regular sphere. The friction force between particles is relatively small. When the positive active material is cold-rolled during the preparation of a positive electrode plate, the particles are prone to shift left and right and slip relative to each other, thereby compressing the positive current collector 2. In some embodiments, the positive current collector is a metal foil. The metal foil includes, but is not limited to, a copper foil or aluminum foil, for example. In some embodiments, the positive current collector is an aluminum foil.

When the positive active material contains solely primary particles, if the sum of the thickness of the positive film layer and the thickness of the positive current collector is less than the particle diameter $Dv_{99}$ of the positive active material particles, the particles are very prone to a defective appearance such as particle scratches and bumps during coating. The particles are very prone to be crushed during cold-rolling, thereby resulting in defective appearance of the electrode plate, and being prone to problems such as gassing in high-temperature storage and cycle acceleration in the manufactured battery cells.

In some embodiments, the positive active material contains solely secondary particles, and the mass percent of the primary particles in the positive active material is 0%. The relationship between the positive film layer and the positive active material satisfies: $D_l \geq 1.1\ Dv_{99}$.

Figure 2:
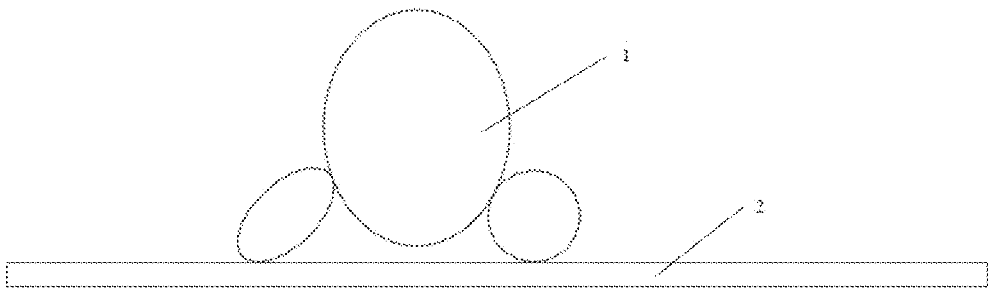
FIG. 2 is a schematic diagram of a positional relationship between secondary particles and a current collector after cold-pressing when a positive active material is the secondary particles.

As shown in FIG. 2, the secondary particle is formed by agglomerating two or more primary particles. The friction force between the particles is relatively large. During the preparation of the positive electrode plate, the particles are not prone to slip relative to each other when subjected to cold-rolling. Therefore, the positive active material particles 1 will not compress the positive current collector 2.

When the positive active material contains solely secondary particles, due to the special structural characteristics of the secondary particles, the size relationship between the positive film layer and the positive active material particles is designed in such a way that the thickness of the positive film layer is greater than or equal to 1.1 times $Dv_{99}$ of the secondary particles. If the thickness of the positive film layer is less than 1.1 times the particle diameter $Dv_{99}$ of the positive active material particles, the particles are very prone to a defective appearance such as particle scratches and bumps during coating. The particles are very prone to be crushed during cold-rolling, thereby resulting in defective appearance of the electrode plate, and being prone to problems such as gassing in high-temperature storage and cycle acceleration in the manufactured battery cells.

In some embodiments, the positive active material contains primary particles and secondary particles. Based on the mass of the positive active material, the mass percent of the primary particles is greater than or equal to 20%. The relationship between the positive film layer, the positive active material, and the positive current collector satisfies: $D_l \geq Dv_{99} - D_c$. When the positive active material contains both primary particles and secondary particles, if the mass percent of the primary particles is greater than or equal to the above range, the primary particles can be evenly distributed in the secondary particles to effectively prevent contact between the secondary particles and serve a function of lubrication. This circumstance is similar to the circumstance in which the positive active material contains solely primary particles. In this case, if the sum of the thickness of the positive film layer and the thickness of the positive current collector is less than the particle diameter $Dv_{99}$ of the positive active material particles, the particles are very prone to a defective appearance such as particle scratches and bumps during coating. The particles are very prone to be crushed during cold-rolling, thereby resulting in defective appearance of the electrode plate, and being prone to problems such as gassing in high-temperature storage and cycle acceleration in the manufactured battery cells. In some embodiments, the positive active material contains primary particles and secondary particles. Based on the mass of the positive active material, the mass percent of the primary particles is greater than or equal to 40 wt %.

In some embodiments, the positive active material contains primary particles and secondary particles. Based on the mass of the positive active material, the mass percent of the primary particles is less than 20%. The relationship between the positive film layer, the positive active material, and the positive current collector satisfies: $D_l \geq 1.1\ Dv_{99}$. When the positive active material contains both primary particles and secondary particles, if the mass percent of the primary particles is less than the above range, the primary particles are unable to sufficiently prevent contact between the secondary particles, and the slip between the secondary particles is more difficult. This circumstance is similar to the circumstance in which the positive active material contains solely secondary particles. In this case, if the thickness of the positive film layer is less than 1.1 times the particle diameter $Dv_{99}$ of the positive active material particles, the particles are very prone to a defective appearance such as particle scratches and bumps during coating. The particles are very prone to be crushed during cold-rolling, thereby resulting in defective appearance of the electrode plate, and being prone to problems such as gassing in high-temperature storage and cycle acceleration in the manufactured battery cells. In some embodiments, the positive active material contains primary particles and secondary particles. Based on the mass of the positive active material, the mass percent of the primary particles is less than or equal to 10 wt %.

Fast-charge and fast-discharge technology means the technology of charging and discharging a battery at a current rate 1 C or higher. When the battery is charged by use of the fast-charge technology, the battery can be charged rapidly without damaging the battery or impairing the lifespan. However, the fast-charge and fast-discharge technology requires the battery to be capable of being charged at a high rate. Therefore, the ion polarization of the battery cell needs to be alleviated to enable the high-rate charging function of the battery. The applicant hereof finds that the thin-electrode design of a battery can shorten a lithium-ion transmission path and alleviate the ion polarization of the battery cell. However, in a battery with a thin-electrode design, if the size of the main material is not designed properly, the particles are prone to be crushed during cold-pressing, thereby impairing the appearance of the electrode plate and the battery performance.

In the electrochemical device of this application, the design of the positive electrode manipulates different structural characteristics of both primary particles and secondary particles, and arranges the sizes of the positive film layer, the positive active material, and the positive current collector to satisfy a specified relationship. When applied to a fast-charge battery, such materials of the positive electrode can maximally avoid hazards during the use of fast-charge battery, make the particles not prone to be crushed during cold-pressing, and improve the appearance of the electrode plate and enhance the battery performance while achieving desirable fast-charge performance, storage performance, and cycle performance.

In some embodiments of this application, an upper limit of the thickness of a positive film layer applied on a single side of the positive current collector corresponding to the thin electrode is 30 μm. In some embodiments, the thickness $D_l$ of the positive film layer is 1 μm to 30 μm. The positive electrode plate with such a thickness of the film layer indicates that the corresponding electrode is designed to be relatively thin, and can more effectively shorten the lithium ion transmission path and reduce the ion polarization of the battery cell. When such a design is coupled with the appropriate sizes of the positive current collector and positive active material of this application, the battery is improved in fast-charge performance, storage performance, and cycle performance concurrently.

In some embodiments, the thickness $D_c$ of the positive current collector is 4 μm to 20 μm.

In some embodiments, a relationship between the thickness $D_l$ of the positive film layer and the thickness $D_c$ of the positive current collector satisfies: $0.05 \leq D_l/D_c \leq 3.75$. When the thickness ratio between the positive film layer and the positive current collector falls within the above range, the safety hazards can be reduced. If the thickness ratio is relatively low, the thickness of the positive film layer is relatively small, thereby potentially increasing the probability of scratching the electrode plate and exposing the metal during the production of the electrode plate. If the thickness ratio is relatively high, the thickness of the positive film layer is relatively large and the thickness of the positive current collector is relatively small, thereby potentially increasing the probability of brittle fracture of the electrode plate at an inner cycle during cold-pressing and winding of the electrode plate. In some embodiments, a relationship between the thickness $D_l$ of the positive film layer and the thickness $D_c$ of the positive current collector satisfies: $0.3 \leq D_l/D_c \leq 3.1$.

The particle size of the positive active material affects the solid-phase diffusion resistance of the positive active material particles in the positive film layer, and in turn, affects the battery performance. In some embodiments, the particle diameter $D_{v99}$ of the positive active material is 5 μm to 48 μm. If the particle size of the positive active material is relatively large, the solid-phase diffusion resistance will be relatively large, thereby resulting in relatively intense charge-and-discharge polarization of the battery, thereby impairing the cycle performance. In some embodiments, the particle diameter $D_{v99}$ of the positive active material is 20 μm to 40 μm.

In some embodiments, a compaction density of the positive film layer is 2 g/dm$^3$ to 4.3 g/dm$^3$.

In this application, the parameters of the positive film layer, the positive current collector, and the positive active material may be tested according to the following methods, or may be tested according to other known methods in the art. All the obtained test results fall within the specified range at a tolerable error:

The $Dv_{99}$ of the positive active material may be measured for three times by a Malvern 3000 laser particle size analyzer, and an average value of the three measured values is the test result.

The thickness $D_c$ of the positive current collector may be measured by using a ten-thousandth micrometer. Five equally spaced points are selected on the surface of the positive current collector and tested, and an average value of the five measured values is the test result.

The thickness $D_l$ of the positive film layer is the thickness of the film layer on a single side of the current collector after the positive electrode plate is cold-pressed. When the positive film layer is disposed on a single surface of the positive current collector, the thickness of the positive film layer is equal to the thickness of the positive electrode plate minus the thickness of the positive current collector. When the positive film layer is disposed on both surfaces of the positive current collector, the thickness of the positive film layer is: (thickness of the positive electrode plate—the thickness of the positive current collector)/2. The thickness of the positive electrode plate may be measured by using a ten-thousandth micrometer. Five equally spaced points are selected on the surface of the positive electrode plate and tested, and an average value of the five measured values is the test result.

$$\text{Compaction density of the positive film layer} = \text{mass of the positive film layer}/\text{area of the positive film layer}/\text{thickness of the positive film layer.}$$

The positive active material may be one of various conventional materials that are known in this field as suitable for use in an electrochemical device and that enable reversible intercalation and deintercalation of active ions. In some embodiments, the positive active material includes at least one of lithium cobalt oxide, lithium manganese oxide, lithium nickel cobalt manganese oxide (NCM), or lithium nickel cobalt aluminum oxide (NCA).

The positive film layer further includes a positive conductive agent. The positive conductive agent may be a conductive agent known in this field as suitable for use in a positive film layer. In this application, the positive conductive agents include, but are not limited to: natural graphite, artificial graphite, conductive carbon black, acetylene black, Ketjen black, carbon fibers, polyphenylene derivative, metal powder, and metal fibers. The metal powder and the metal fibers may be, but are not limited to, powder or fibers of copper, nickel, aluminum, or silver.

The positive film layer further includes a positive binder. The positive binder may be a binder known in this field as suitable for use in a positive film layer. In this application, the positive binder may be, but is not limited to polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene difluoride, polyethylene, polypropylene, styrene-butadiene rubber, acrylic (acrylate) styrene-butadiene rubber, epoxy resin, or nylon.

The method for preparing the positive electrode plate may be a preparation method of a positive electrode plate known in this field as applicable to an electrochemical device. In some embodiments, a positive slurry is typically prepared by the following method: adding a solvent, a positive active material, a positive binder, and, as required, a positive conductive agent and a thickener, and dissolving or dispersing such agents in the solvent to form a positive slurry. The solvent is removed by volatilizing during drying. The solvent is a solvent known in this field as suitable for use in a positive film layer. The solvent may be, but is not limited to, N-methyl-pyrrolidone (NMP). The mixing ratio between the positive active material, the positive binder, and the positive conductive agent in the positive film layer is not particularly limited in this application, and the mixing ratio may be controlled based on the desired performance of the electrochemical device.

In some embodiments, the positive current collector includes a blank region and a covered region. The blank region is a region not covered with the positive film layer on the positive current collector. The covered region is a region covered with the positive film layer on the positive current collector.

If the surface roughness of the blank region is overly low, there will be fewer contact points between the binder and the positive collector, thereby impairing the initial bonding force of the positive electrode plate, and resulting in a debonding problem to some extent after the electrode plate is coated. If the surface roughness of the blank region is overly high, it means that there are many defects in the positive current collector, thereby impairing the mechanical properties to some extent and increasing the brittleness of the electrode plate. In some embodiments, the roughness of the blank region is 500 $mm^{-1}$ to 2000 $mm^{-1}$, thereby endowing the electrode plate with a good bonding force, reducing the brittleness of the electrode plate, and effectively improving the battery performance. In some embodiments, the roughness of the blank region is 700 $mm^{-1}$ to 1500 $mm^{-1}$.

If the surface roughness of the covered region is overly low, it means that the riveting effect between the positive active material and the positive current collector is relatively weak, thereby impairing the bonding force of the electrode plate to some extent. If the surface roughness of the covered region is overly high, it means that the positive current collector is damaged to a relatively great extent during the cold-pressing, resulting in a possibility of crushing the particles and penetrating the positive current collector due to the pressing, and in turn, resulting in hazards of a loss of electrical properties and a loss of a potential difference window. In some embodiments, the roughness of the covered region is 1500 $mm^{-1}$ to 8000 $mm^{-1}$, thereby endowing the electrode plate with a good bonding force, reducing the hazards of crushing the particles and penetrating the current collector, and effectively improving the battery performance. In some embodiments, the roughness of the covered region is 2000 $mm^{-1}$ to 5000 $mm^{-1}$.

In this application, the roughness of the current collector may be controlled by creating open dents on the surface of the current collector, or may be controlled by other methods known in the art. Those skilled in the art may choose the control method according to the actual situation. In this application, the roughness of the current collector may be measured by a method known in the art. For example, the roughness of both the blank region and the covered region of the positive current collector may be measured by using a Japan Mitutoyo SJ-210 roughness tester. In some embodiments, a test method for the covered region is: Soaking the positive electrode plate in a N-methyl-pyrrolidone (NMP) solvent for 10 minutes; taking out the positive electrode plate, scraping off the positive active film layer on the surface of the positive current collector by use of a scraper; rinsing the surface of the positive current collector again by use of a clean NMP solvent to make the surface free of foreign matters; finally, drying the positive current collector in an oven at 85° C., taking out the positive current collector that is dry, and measuring the roughness of the current collector by use of a Japan Mitutoyo SJ-210 roughness tester to obtain the roughness of the covered region.

[Negative Electrode]

The negative electrode includes a negative current collector and a negative film layer disposed on at least one surface of the negative current collector. The negative film layer includes a negative active material. In some embodiments, the negative current collector is metal, including but not limited to: a copper foil, a nickel foil, a stainless steel foil, a titanium foil, foamed nickel, foamed copper, or a polymer substrate clad with a conductive metal, or a combination thereof.

The negative active material may be any one of various materials that are known in this field as suitable for use in an electrochemical device and that enable intercalation and deintercalation of active ions or enable adding and removal of active ions. In some embodiments, the negative active material includes at least one of a carbon material, a metal alloy, a lithium-containing oxide, or a silicon-containing material. In some embodiments, the carbon material is selected from a graphite material. In some embodiments, the negative active material is surface-coated or not.

The negative film layer further includes a negative binder. The negative binder is not particularly limited in this application, and may be, but is not limited to, styrene-butadiene rubber (SBR for short), for example. The method for preparing the negative electrode plate may be a preparation method of a negative electrode plate known in this field as applicable to an electrochemical device. In some embodiments, a negative slurry is typically prepared by the following method: adding a solvent, a negative active material, a negative binder, and, as required, a conductive agent and a thickener, and dissolving or dispersing such agents in the solvent to form a negative slurry. The solvent is removed by volatilizing during drying. The solvent is a solvent known in this field as suitable for use in a negative film layer. The solvent may be, but is not limited to, water. The thickener is a thickener known in this field as suitable for use in a negative film layer. The thickener may be, but is not limited to, sodium carboxymethyl cellulose (CMC for short). The mixing ratio between the negative active material, the negative binder, and the thickener in the negative film layer is not particularly limited in this application, and the mixing ratio may be controlled based on the desired performance of the electrochemical device.

[Separator]

In some embodiments of this application, a separator is disposed between the positive electrode and the negative electrode to prevent a short circuit. The material and shape of the separator used in the electrochemical device in this application are not particularly limited, and the separator may be a separator known in this field as suitable for use in an electrochemical device. In some embodiments, the separator includes at least one of polyethylene (PE), poly(ethylene-co-propylene), polypropylene (PP), poly(ethylene-co-butene), poly(ethylene-co-hexene), or poly(ethylene-co-methyl methacrylate). In some embodiments, the separator is a single-layer separator or a multi-layer separator.

[Electrolyte Solution]

The electrochemical device further includes an electrolyte solution. The type of the electrolyte solution is not particularly limited in this application.

In some embodiments, the electrolyte solution includes a lithium salt and an organic solvent. The types of the lithium salt and organic solvent are not particularly limited, and may be selected as actually required. The lithium salt may be, but is not limited to, lithium hexafluorophosphate ($LiPF6$). The organic solvent may be, but is not limited to, a carbonate solvent, a carboxylate solvent, an ether solvent, a sulfone solvent, or other aprotic solvents, for example. The organic solvent may be used alone or added in a mixture. When the nonaqueous organic solvent is added in a mixture, a mixing ratio of the mixture may be controlled based on desired performance of the electrochemical device.

In some embodiments, the electrolyte solution further includes an additive. The type of the additive is not particularly limited, and may be a negative film-forming additive, a positive film-forming additive, or an additive that can improve some performance indicators of the battery, for example, an additive that improves overcharge performance of the battery, an additive that improves high-temperature performance of the battery, an additive that improves low-temperature performance of the battery, or the like.

In some embodiments, the additive includes an ether dinitrile compound. The ether dinitrile compound can form a film on the surface of the positive electrode to improve the thermal stability of the positive electrode and further improve the high-temperature storage performance of the electrochemical device.

The term “ether dinitrile compound” means a compound containing an ether bond and two cyano groups. In some embodiments, the ether dinitrile compound includes at least one of ethylene glycol bis(propionitrile) ether, diethylene glycol bis(2-cyanoethyl) ether, triethylene glycol bis(2-cyanoethyl) ether, tetraethylene glycol bis(2-cyanoethyl) ether, ethylene glycol bis(4-cyanobutyl) ether, or 3,3'-oxydipropionitrile.

In some embodiments, based on a total mass of the electrolyte solution, a mass percent of the ether dinitrile compound is 0.01 wt % to 15 wt %. If the dosage of the ether dinitrile compound is greater than the above range, there will be a large number of reactions between the ether dinitrile compound and the electrolyte solution, thereby potentially impairing the first-cycle Coulombic efficiency of the battery cell. In addition, the ether dinitrile compound will form a thick film on the positive electrode, thereby potentially increasing the ion transfer resistance, and in turn, impairing the fast-charge and fast-discharge capabilities of the battery cell. If the dosage of the ether dinitrile compound is less than the above range, the ether dinitrile compound may be unable to effectively form a film on the positive electrode, thereby being detrimental to exerting the protective effect of the ether dinitrile compound. In some embodiments, based on the total mass of the electrolyte solution, the mass percent of the ether dinitrile compound is less than or equal to 5 wt %.

The conductivity of the electrolyte solution is not particularly limited in this application. In some embodiments, the conductivity of the electrolyte solution is greater than or equal to 7 mS/cm. When the conductivity of the electrolyte solution falls within the above range, the electrolyte solution is of relatively high ion conductivity, thereby meeting the requirement of rapid movement of lithium ions in the fast-charge and fast-discharge technology. If the conductivity is overly low, the battery may incur relatively intense polarization, thereby impairing the charge-and-discharge performance of the battery to some extent. The method for controlling the conductivity of the electrolyte solution is not particularly limited in this application, and those skilled in the art may choose a method known in the art to adjust the conductivity of the electrolyte solution according to actual conditions. In this application, the conductivity of the electrolyte solution may be controlled by controlling the type and concentration of the lithium salt added, and the viscosity and dielectric constant of the organic solvent.

Electronic Device

The electronic device in this embodiment may be any electronic device, and may be, but without being limited to, a notebook computer, pen-inputting computer, mobile computer, e-book player, portable phone, portable fax machine, portable photocopier, portable printer, stereo headset, video recorder, liquid crystal display television set, handheld cleaner, portable CD player, mini CD-ROM, transceiver, electronic notepad, calculator, memory card, portable voice recorder, radio, backup power supply, motor, automobile, motorcycle, power-assisted bicycle, bicycle, lighting appliance, toy, game console, watch, electric tool, flashlight, camera, large household battery, or lithium-ion capacitor. It is hereby noted that the electrochemical device according to this application is not only applicable to the electronic devices enumerated above, but also applicable to energy storage stations, marine transport vehicles, and air transport vehicles. The air transport vehicles include air transport vehicles in the atmosphere and space transport vehicles outside the atmosphere.

In some embodiments, the electronic device includes the electrochemical device described herein above.

This application is further described below with reference to some embodiments. Understandably, such embodiments are merely intended to illustrate this application but not to limit the scope of this application. In the following specific embodiments of this application, an example is given in which the battery is a lithium-ion battery, but this application is not limited to the example. Unless otherwise expressly specified, reagents, materials, and instruments used in the following embodiments and comparative embodiments are all commercially available or obtained by synthesis.

Embodiment 1

Preparing a Positive Electrode

Grinding lithium cobalt oxide, selecting the lithium cobalt oxide particles with a particle diameter of approximately 38 μm, and measuring the $Dv_{99}$ of the lithium cobalt oxide positive active material by use of a Malvern 3000 laser particle size analyzer, recorded as 38.2 μm.

Mixing well the positive active material, polyvinylidene difluoride, and conductive carbon black (SP) at a mass ratio of 97:1.5:1.5 in an appropriate amount of N-methyl-pyrrolidone (NMP) solvent to form a homogeneous positive slurry. Coating a surface of a current collector aluminum foil (thickness $D_c$=10 μm) with the slurry, and performing steps such as drying and cold-pressing to obtain a positive electrode plate. Measuring the compaction density of the positive film layer, recorded as 4.15 g/dm$^3$.

Measuring the thickness $D_l$ of the positive film layer by use of a ten-thousandth micrometer, recorded as 30 μm, and measuring the thickness of the positive electrode plate, recorded as 70 μm. Measuring the roughness of the blank region of the current collector by use of a Japan Mitutoyo SJ-210 roughness tester, recorded as 800 mm$^{-1}$, and measuring the roughness of the covered region, recorded as 2300 mm$^{-1}$.

Preparing a Negative Electrode

Mixing well graphite, styrene-butadiene rubber, and sodium carboxymethyl cellulose at a mass ratio of 97.4:1.2:1.4 in an appropriate amount of deionized water solvent to form a homogeneous negative slurry, coating a current collector copper foil with the slurry, and drying and cold-pressing the foil to obtain a negative electrode plate.

Preparing a Separator

Using a PE porous polymer film as a separator.

Preparing an Electrolyte Solution

Mixing well ethylene carbonate (EC for short), propylene carbonate (PC for short), diethyl carbonate (DEC for short), ethyl propionate (EP for short), propyl propionate (PP for short) at a mass ratio of 1:1:1:1:1 in an argon atmosphere glovebox in which the water content is less than 10 ppm to form an organic solvent, dissolving an appropriate amount of well-dried lithium salt $LiPF_6$ in the organic solvent, and finally, adding ether dinitrile (3,3'-oxydipropionitrile) at a mass percent of 5 wt % based on the total mass of the electrolyte solution into the organic solvent to form an electrolyte solution. Measuring the conductivity of the electrolyte solution by use of a conductivity tester, recorded as 10 mS/cm.

Preparing a Lithium-Ion Battery

Winding the positive electrode plate, the separator, and the negative electrode plate in the order from one layer of positive electrode plate to one layer of separator and then one layer of negative electrode plate to form an electrode assembly, and then performing packaging, electrolyte injection, and static standing to obtain a well-infiltrated electrode assembly. Subsequently, performing the steps of chemical formation and capacity grading to form an SEI film on the surface of the negative electrode, thereby activating the lithium-ion battery, making the battery enter a charged state, and then obtaining a finished lithium-ion battery.

Embodiments 2 to 19

The preparation method is the same as that in Embodiment 1 except that some parameters of the positive active material, current collector, positive film layer, and electrolyte solution are adjusted in Embodiments 2 to 19, as detailed in Table 1.

Embodiment 20

The preparation method in this embodiment is identical to the preparation method in Embodiment 1 except that, in Embodiment 20, the mass percent of the ether dinitrile in the electrolyte solution is 13 wt %, the conductivity of the electrolyte solution is 12 mS/cm, and the preparation process of the positive electrode is as follows:

Grinding lithium cobalt oxide, selecting small-sized lithium cobalt oxide particles, sintering the particles, pulverizing the particles by use of a jet mill to obtain lithium cobalt oxide secondary particles with a particle size of approximately 18 μm; and mixing well the secondary particles with a particle size of approximately 18 μm with primary particles at a mass ratio of 5:5 to obtain a positive active material containing the primary particles and the secondary particles. Measuring the $Dv_{99}$ of the positive active material by use of a Malvern 3000 laser particle size analyzer, recorded as 18 μm.

Mixing well the positive active material, polyvinylidene difluoride, and conductive carbon black (SP) at a mass ratio of 97:1.5:1.5 in an appropriate amount of N-methyl-pyrrolidone (NMP) solvent to form a homogeneous positive slurry. Coating a surface of a current collector aluminum foil (thickness $D_c$=10 μm) with the slurry, and performing steps such as drying and cold-pressing to obtain a positive electrode plate. Measuring the compaction density of the positive film layer, recorded as 3.5 g/dm$^3$.

Measuring the thickness $D_l$ of the positive film layer by use of a ten-thousandth micrometer, recorded as 20 μm, and measuring the thickness of the positive electrode plate, recorded as 50 μm. Measuring the roughness of the blank region of the current collector by use of a Japan Mitutoyo SJ-210 roughness tester, recorded as 1300 mm$^{-1}$, and measuring the roughness of the covered region, recorded as 3800 mm$^{-1}$.

Embodiments 21 to 26

The preparation method is the same as that in Embodiment 20 except that some parameters of the positive active material, current collector, positive film layer, and electrolyte solution are adjusted in Embodiments 21 to 26, as detailed in Table 1.

Embodiment 27

The preparation method in this embodiment is identical to the preparation method in Embodiment 1 except that, in Embodiment 27, the mass percent of the ether dinitrile in the electrolyte solution is 1 wt %, the conductivity of the electrolyte solution is 9.8 mS/cm, and the preparation process of the positive electrode is as follows:

Grinding lithium cobalt oxide, selecting the small-sized lithium cobalt oxide particles, sintering the particles, and pulverizing the sintered particles by use of a jet mill to obtain lithium cobalt oxide secondary particles with a particle diameter of approximately 18 μm. Measuring the $Dv_{99}$ of the lithium cobalt oxide secondary particles as a positive active material by use of a Malvern 3000 laser particle size analyzer, recorded as 17.6 μm.

Mixing well the positive active material, polyvinylidene difluoride, and conductive carbon black (SP) at a mass ratio of 97:1.5:1.5 in an appropriate amount of N-methyl-pyrrolidone (NMP) solvent to form a homogeneous positive slurry. Coating a surface of a current collector aluminum foil (thickness $D_c$=8 μm) with the slurry, and performing steps such as drying and cold-pressing to obtain a positive electrode plate. Measuring the compaction density of the positive film layer, recorded as 4.15 g/dm$^3$.

Measuring the thickness $D_l$ of the positive film layer by use of a ten-thousandth micrometer, recorded as 23.5 μm, and measuring the thickness of the positive electrode plate, recorded as 55 μm. Measuring the roughness of the blank region of the current collector by use of a Japan Mitutoyo SJ-210 roughness tester, recorded as 800 mm$^{-1}$, and measuring the roughness of the covered region, recorded as 5700 mm$^{-1}$.

Embodiments 28 to 36

The preparation method is the same as that in Embodiment 27 except that some parameters of the positive active material, current collector, positive film layer, and electrolyte solution are adjusted in Embodiments 28 to 36, as detailed in Table 2.

Comparative Embodiment 1

The preparation method is the same as that in Embodiment 1 except that the $Dv_{99}$ of the positive active material in Comparative Embodiment 1 is 45 μm.

Comparative Embodiment 2

The preparation method is the same as that in Embodiment 20 except that, in Comparative Embodiment 2, the thickness $D_l$ of the positive film layer is 7.5 μm, the thickness of the positive electrode plate is 25 μm, and the compaction density of the positive film layer is 4.15 g/dm$^3$.

Comparative Embodiment 3

The preparation method is the same as that in Embodiment 24 except that, in Comparative Embodiment 3, the thickness $D_l$ of the positive film layer is 5 μm, the thickness of the positive electrode plate is 20 μm, and the compaction density of the positive film layer is 4.15 g/dm$^3$. Measuring the roughness of the blank region of the current collector by use of a Japan Mitutoyo SJ-210 roughness tester, recorded as 900 mm$^{-1}$, and measuring the roughness of the covered region, recorded as 6300 mm$^{-1}$.

Comparative Embodiment 4

The preparation method is the same as that in Embodiment 27 except that, in Comparative Embodiment 4, the $Dv_{99}$ of the positive active material is 25 μm, the thickness $D_c$ of the aluminum foil is 12 μm, the thickness $D_l$ of the positive film layer is 24 μm, and the thickness of the positive electrode plate is 60 μm.

Comparative Embodiment 5

The preparation method is the same as that in Embodiment 26 except that, in Comparative Embodiment 5, the $Dv_{99}$ of the positive active material is 17 μm, the thickness $D_c$ of the aluminum foil is 9 μm, the thickness $D_l$ of the positive film layer is 18 μm, the thickness of the positive electrode plate is 45 μm, and the compaction density of the positive film layer is 3.8 g/dm$^3$.

It is hereby noted that the primary particles used in Embodiments 1 to 36 and Comparative Embodiments 1 to 5 may be obtained by the method described in the embodiments and comparative embodiments of this application, or obtained directly from the commercial market; and, the secondary particles used in Embodiments 1 to 36 and Comparative Embodiments 1 to 5 may be obtained by sintering the primary articles according to the methods described in the embodiments and comparative embodiments of this application, or obtained directly from the commercial market.

Method for Testing the Performance of a Lithium-Ion Battery:

Testing the 85° C. storage performance

Charging the lithium-ion battery at a constant current of 0.5 C at a temperature of 25° C. until a voltage of 4.48 V, and then charging the battery at a constant voltage until a current of 0.025 C. Measuring the thickness of the lithium-ion battery at this time, denoted as do. Placing the lithium-ion battery into an 85° C. oven to stand for 6 hours, and taking the battery out and measuring the thickness of the lithium-ion battery at this time (when the battery is still hot), denoted as d.

Thickness expansion rate of the lithium-ion battery after 6 hours of high-temperature storage at 85° C. (%)=$(d-d_0)/d_0\times100\%$.

(If the thickness expansion rate is greater than 10%, the battery is substandard)

Testing the 45° C. Cycle Performance

Discharging the lithium-ion battery at a temperature of 45° C. and a current of 1.0 C until the voltage reaches 3.0 V, leaving the battery to stand for 5 minutes, charging the battery at a current of 0.7 C until the voltage reaches 4.48 V, and then charging the battery at a constant voltage until the current reaches 0.025 C, and leaving the battery to stand for 5 minutes. Using the above process as one cycle, letting the fourth discharge capacity be 100%, and recording the number of cycles when the discharge capacity drops to 80%.

Testing the Appearance of the Positive Electrode Plate

Observing the appearance of the prepared positive electrode plate, and classifying the electrodes plates according to the following criteria:

The electrode plate is recorded as excellent if the appearance is free from abnormal phenomena such as scratches and bumps.

The electrode plate is recorded as good if the number of scratches is less than 1 and no metal is exposed or the number of bumps is less than or equal to 3.

The electrode plate is recorded as inferior if the number of scratches is greater than 1 or the number of bumps is greater than 3.

TABLE 1

Parameters and performance test results in Embodiments 1 to 26

| | Type of main material of positive active material | Particle diameter $D_{v99}$ of positive active material (μm) | Thickness $D_c$ of current collector aluminum foil (μm) | Thickness $D_l$ of positive film layer (μm) | Thickness of positive electrode plate (μm) | Roughness of blank region of current collector (mm$^{-1}$) | Roughness of covered region of current collector (mm$^{-1}$) | Content of ether dinitrile (wt %) |
|---|---|---|---|---|---|---|---|---|
| Embodiment 1 | Primary particles | 38.2 | 10 | 30 | 70 | 800 | 2300 | 5% |
| Embodiment 2 | Primary particles | 38.2 | 10 | 29 | 68 | 900 | 2500 | 5% |
| Embodiment 3 | Primary particles | 38.2 | 12 | 28 | 68 | 1800 | 2100 | 5% |
| Embodiment 4 | Primary particles | 28.8 | 10 | 27.5 | 65 | 1500 | 2700 | 5% |
| Embodiment 5 | Primary particles | 28.8 | 10 | 29.6 | 69.2 | 700 | 2200 | 5% |
| Embodiment 6 | Primary particles | 28.8 | 12 | 28.3 | 68.6 | 1100 | 2300 | 1% |

TABLE 1-continued

Parameters and performance test results in Embodiments 1 to 26

| | | | | | | | | |
|---|---|---|---|---|---|---|---|---|
| Embodiment 7 | Primary particles | 14.6 | 8 | 20.2 | 48.4 | 1300 | 2300 | 1% |
| Embodiment 8 | Primary particles | 14.6 | 9 | 15.8 | 40.6 | 1700 | 2700 | 1% |
| Embodiment 9 | Primary particles | 14.6 | 13 | 14.1 | 41.2 | 1300 | 2900 | 1% |
| Embodiment 10 | Primary particles | 10.2 | 10 | 1.5 | 13 | 1300 | 1500 | 1% |
| Embodiment 11 | Primary particles | 14.6 | 8 | 20.2 | 48.4 | 300 | 1300 | 1% |
| Embodiment 12 | Primary particles | 14.6 | 9 | 15.8 | 40.6 | 2500 | 9000 | 1% |
| Embodiment 13 | Primary particles | 14.6 | 9 | 15.8 | 40.6 | 1700 | 2700 | 0% |
| Embodiment 14 | Primary particles | 14.6 | 9 | 15.8 | 40.6 | 1700 | 2700 | 16% |
| Embodiment 15 | Primary particles | 10.2 | 10 | 1.5 | 13 | 1300 | 1500 | 1% |
| Embodiment 16 | Primary particles | 10.2 | 10 | 0.4 | 11 | 1300 | 1500 | 1% |
| Embodiment 17 | Primary particles | 10.2 | 10 | 40 | 11 | 1300 | 1500 | 1% |
| Embodiment 18 | Primary particles | 10.2 | 10 | 1.5 | 13 | 1300 | 1500 | 1% |
| Embodiment 19 | Primary particles | 10.2 | 10 | 0.4 | 11 | 1300 | 3500 | 1% |
| Embodiment 20 | Primary particles:secondary particles = 5:5 | 18 | 10 | 20 | 50 | 1300 | 3800 | 13% |
| Embodiment 22 | Primary particles:secondary particles = 8:2 | 20 | 10 | 25 | 60 | 1300 | 3100 | 13% |
| Embodiment 23 | Primary particles:secondary particles = 8:2 | 20 | 10 | 15 | 40 | 1300 | 3600 | 13% |
| Embodiment 24 | Primary particles:secondary particles = 2:8 | 17 | 10 | 22.5 | 55 | 1300 | 5800 | 13% |
| Embodiment 25 | Primary particles:secondary particles = 2:8 | 17 | 10 | 18 | 46 | 1300 | 4800 | 13% |
| Embodiment 26 | Primary particles:secondary particles = 1:9 | 16 | 10 | 22.5 | 55 | 1300 | 3800 | 13% |

| | Conductivity of electrolyte solution (mS/cm) | Compaction density of positive film layer (g/dm$^3$) | $D_1-(D_{v99}-D_c)$ | $D_1-1.1\ D_{99}$ | $D_1/D_c$ | Appearance of electrode plate | Thickness expansion rate after 6 hours of storage at 85° C. | Number of cycles when 45° C. discharge capacity drops to 80% |
|---|---|---|---|---|---|---|---|---|
| Embodiment 1 | 10 | 4.15 | 1.8 | −12.02 | 3 | Excellent | 7.20% | 773 |
| Embodiment 2 | 11.5 | 4.15 | 0.8 | −13.02 | 2.9 | Good | 7.10% | 782 |
| Embodiment 3 | 12 | 4.15 | 1.8 | −14.02 | 2.33 | Good | 7.60% | 798 |
| Embodiment 4 | 9 | 4.15 | 8.7 | −4.18 | 2.75 | Excellent | 6.90% | 754 |
| Embodiment 5 | 7 | 4.15 | 10.8 | −2.08 | 2.96 | Excellent | 7.10% | 768 |
| Embodiment 6 | 8.5 | 4.15 | 11.5 | −3.38 | 2.36 | Excellent | 6.80% | 743 |
| Embodiment 7 | 10.5 | 3.8 | 13.6 | 4.14 | 2.53 | Excellent | 7.70% | 702 |
| Embodiment 8 | 9.5 | 3.8 | 10.2 | −0.26 | 1.76 | Excellent | 7.50% | 732 |
| Embodiment 9 | 11.2 | 3.8 | 12.5 | −1.96 | 1.08 | Excellent | 7.30% | 718 |
| Embodiment 10 | 11.2 | 3.8 | 1.3 | −9.72 | 0.15 | Excellent | 7.30% | 718 |
| Embodiment 11 | 10.5 | 3.8 | 13.6 | 4.14 | 2.53 | Good | 10.50% | 535 |
| Embodiment 12 | 9.5 | 3.8 | 10.2 | −0.26 | 1.76 | Good | 9.20% | 582 |
| Embodiment 13 | 9.5 | 3.8 | 10.2 | −0.26 | 1.76 | Excellent | 9.80% | 598 |
| Embodiment 14 | 9.5 | 3.8 | 10.2 | −0.26 | 1.76 | Excellent | 8.80% | 524 |
| Embodiment 15 | 6 | 3.8 | 1.3 | −9.72 | 0.15 | Excellent | 7.30% | 518 |
| Embodiment 16 | 11.2 | 3.8 | 0.2 | −10.82 | 0.04 | Good | 7.30% | 712 |
| Embodiment 17 | 11.2 | 3.8 | 39.8 | 28.78 | 4 | Excellent | 7.30% | 556 |
| Embodiment 18 | 11.2 | 1.4 | 1.3 | −9.72 | 0.15 | Good | 9.30% | 530 |
| Embodiment 19 | 11.2 | 4.35 | 0.2 | −10.82 | 0.04 | Good | 9.30% | 512 |
| Embodiment 20 | 12 | 3.5 | 12 | 0.2 | 2 | Excellent | 6.80% | 730 |
| Embodiment 22 | 11.5 | 3.5 | 15 | 3 | 2.5 | Excellent | 7.40% | 750 |
| Embodiment 23 | 11.5 | 3.5 | 5 | −7 | 1.5 | Excellent | 6.80% | 710 |
| Embodiment 24 | 11.5 | 3.5 | 15.5 | 3.8 | 2.25 | Good | 6.50% | 712 |
| Embodiment 25 | 11.5 | 3.5 | 11 | −0.7 | 1.8 | Excellent | 7.10% | 738 |
| Embodiment 26 | 12 | 3.5 | 16.5 | 4.9 | 2.25 | Good | 6.70% | 730 |

TABLE 2

Parameters and performance test results in Embodiments 27 to 36 and Comparative Embodiments 1 to 5

| | Type of main material of positive active material | Particle diameter $D_{v99}$ of positive active material (μm) | Thickness $D_c$ of current collector aluminum foil (μm) | Thickness $D_1$ of positive film layer (μm) | Thickness of positive electrode plate (μm) | Roughness of blank region of current collector ($mm^{-1}$) | Roughness of covered region of current collector ($mm^{-1}$) | Content of ether dinitrile (wt %) |
|---|---|---|---|---|---|---|---|---|
| Embodiment 27 | Secondary particles | 17.6 | 8 | 23.5 | 55 | 800 | 5700 | 1% |
| Embodiment 28 | Secondary particles | 17.6 | 9 | 30 | 69 | 900 | 6300 | 13% |
| Embodiment 29 | Secondary particles | 17.6 | 13 | 26 | 65 | 1100 | 7100 | 13% |
| Embodiment 30 | Secondary particles | 11.2 | 10 | 15.3 | 40.6 | 1500 | 7200 | 13% |
| Embodiment 31 | Secondary particles | 11.2 | 10 | 17.4 | 44.8 | 700 | 6800 | 13% |
| Embodiment 32 | Secondary particles | 11.2 | 12 | 14.1 | 40.2 | 900 | 7100 | 13% |
| Embodiment 33 | Secondary particles | 17.6 | 8 | 23.5 | 55 | 800 | 5700 | 8% |
| Embodiment 34 | Secondary particles | 17.6 | 9 | 30 | 69 | 900 | 6300 | 13% |
| Embodiment 35 | Secondary particles | 4 | 9 | 15 | 39 | 900 | 3300 | 13% |
| Embodiment 36 | Secondary particles | 48 | 15 | 55 | 125 | 900 | 5800 | 13% |
| Comparative Embodiment 1 | Primary particles | 45 | 10 | 30 | 70 | 800 | 2300 | 5% |
| Comparative Embodiment 2 | Primary particles:secondary particles = 5:5 | 18 | 10 | 7.5 | 25 | 1300 | 3800 | 13% |
| Comparative Embodiment 3 | Primary particles:secondary particles = 2:8 | 17 | 10 | 5 | 20 | 900 | 6300 | 13% |
| Comparative Embodiment 4 | Secondary particles | 25 | 12 | 24 | 60 | 800 | 5700 | 1% |
| Comparative Embodiment 5 | Primary particles:secondary particles = 1:9 | 17 | 9 | 18 | 45 | 1300 | 3800 | 13% |

| | Conductivity of electrolyte solution (mS/cm) | Compaction density of positive film layer ($g/dm^3$) | $D_1 - (D_{v99} - D_c)$ | $D_1 - 1.1\ D_{99}$ | $D_1/D_c$ | Appearance of electrode plate | Thickness expansion rate after 6 hours of storage at 85° C. | Number of cycles when 45° C. discharge capacity drops to 80% |
|---|---|---|---|---|---|---|---|---|
| Embodiment 27 | 9.8 | 4.15 | 13.9 | 4.14 | 2.94 | Good | 7.90% | 703 |
| Embodiment 28 | 13 | 4.15 | 21.4 | 10.64 | 3.33 | Excellent | 7.60% | 719 |
| Embodiment 29 | 12.5 | 4.15 | 21.4 | 6.64 | 2 | Excellent | 7.70% | 728 |
| Embodiment 30 | 10.3 | 4.15 | 14.1 | 2.98 | 1.53 | Excellent | 6.90% | 735 |
| Embodiment 31 | 11.5 | 4.15 | 16.2 | 5.08 | 1.74 | Excellent | 6.70% | 748 |
| Embodiment 32 | 9.5 | 4.15 | 14.9 | 1.78 | 1.18 | Good | 7.00% | 729 |
| Embodiment 33 | 6 | 3.4 | 13.9 | 4.14 | 2.94 | Good | 7.00% | 460 |
| Embodiment 34 | 13 | 4.5 | 21.4 | 10.64 | 3.33 | Good | 18.00% | 400 |
| Embodiment 35 | 13 | 3.5 | 20 | 10.6 | 1.67 | Good | 13.80% | 510 |
| Embodiment 36 | 13 | 4.1 | 22 | 2.2 | 3.67 | Good | 5.80% | 533 |
| Comparative Embodiment 1 | 10 | 4.15 | −5.2 | −19.7 | 3 | Inferior | 14.00% | 502 |
| Comparative Embodiment 2 | 12 | 4.15 | −0.5 | −12.3 | 0.75 | Inferior | 13.20% | 380 |
| Comparative Embodiment 3 | 11.5 | 4.15 | −2 | −13.7 | 0.5 | Inferior | 22.00% | 248 |
| Comparative Embodiment 4 | 9.8 | 4.15 | 11 | −3.5 | 2 | Inferior | 15.50 | 435 |
| Comparative Embodiment 5 | 12 | 3.8 | 10 | −0.7 | 2 | Inferior | 14% | 430 |

As can be seen from the data in Table 1 and Table 2, the prepared positive electrode plate exhibits a good appearance, and the prepared lithium-ion battery exhibits good high-temperature storage performance and good high-temperature cycle performance when: (i) the mass percent of the primary particles in the positive active material is greater than or equal to 20% and less than or equal to 100% based on the mass of the positive active material, and $D_l$ of the positive film layer, $Dv_{99}$ of the positive active material, and $D_c$ of the positive current collector satisfy $D_l \geq Dv_{99} - D_c$; or, (ii) the mass percent of the primary particles in the positive active material is greater than or equal to 0% and less than 20% based on the mass of the positive active material, and the positive film layer, the positive active material, and the positive current collector satisfy $D_l \geq 1.1\ Dv_{99}$.

As can be seen from the data in Comparative Embodiment 1 and Embodiment 1, when the positive active material contains solely primary particles, if the sum of the thickness of the positive film layer and the thickness of the current collector aluminum foil is less than the particle diameter $Dv_{99}$ of the positive active material particles, the particles are very prone to a defective appearance such as particle scratches and bumps during coating, and prone to deteriorate the high-temperature storage performance and high-temperature cycle performance of the lithium-ion battery.

As can be seen from the data in Comparative Embodiment 2 versus Embodiment 20 as well as Comparative Embodiment 3 versus Embodiment 24, when the positive active material contains both primary particles and secondary particles and the mass percent of the primary particles is greater than or equal to 20%, if the sum of the thickness of the positive film layer and the thickness of the current collector aluminum foil is less than the particle diameter $Dv_{99}$ of the positive active material particles, the particles are very prone to a defective appearance such as particle scratches and bumps during coating, and prone to deteriorate the high-temperature storage performance and high-temperature cycle performance of the lithium-ion battery.

As can be seen from the data in Comparative Embodiment 4 and Embodiment 27, when the positive active material contains solely secondary particles, if the thickness of the positive film layer is less than 1.1 times the particle diameter $Dv_{99}$ of the positive active material particles, the particles are very prone to a defective appearance such as particle scratches and bumps during coating, and prone to deteriorate the high-temperature storage performance and high-temperature cycle performance of the lithium-ion battery.

As can be seen from the data in Comparative Embodiment 5 and Embodiment 26, when the positive active material contains both primary particles and secondary particles and the mass percent of the primary particles is less than 20%, if the thickness of the positive film layer is less than 1.1 times the particle diameter $Dv_{99}$ of the positive active material particles, the particles are very prone to a defective appearance such as particle scratches and bumps during coating, and prone to deteriorate the high-temperature storage performance and high-temperature cycle performance of the lithium-ion battery.

As can be seen from the data in Embodiments 7 to 8 versus Embodiments 11 to 12, if the roughness of the blank region and the roughness of the covered region of the positive current collector are overly high or low, the appearance of the electrode plate will be impaired, and the high-temperature storage performance and high-temperature cycle performance of the lithium-ion battery will be impaired. In Embodiment 11, the roughness of the blank region of the current collector is lower than 500 $mm^{-1}$ and the roughness of the covered region is lower than 1500 $mm^{-1}$, and therefore, the appearance of the electrode plate is inferior, the thickness expansion rate after storage at a high temperature of 85° C. is relatively high, and the number of cycles counted when the 45° C. discharge capacity drops to 80% is reduced. In Embodiment 12, the roughness of the blank region of the current collector is higher than 2000 $mm^{-1}$ and the roughness of the covered region is higher than 8000 $mm^{-1}$, and therefore, the electrode plate is prone to appearance problems such as particle scratches and bumps, the thickness expansion rate after storage at a high temperature of 85° C. is relatively high, and the number of cycles counted when the 45° C. discharge capacity drops to 80% is reduced.

As can be seen from the data in Embodiment 8 and Embodiments 13 to 14, the ether dinitrile additive affects the storage performance and high-temperature cycle performance of the lithium-ion battery. In Embodiment 13, when no ether dinitrile additive is added, the thickness expansion rate after storage at a high temperature of 85° C. is relatively high, and the number of cycles counted when the 45° C. discharge capacity drops to 80% is reduced. In Embodiment 14, when excessive ether dinitrile additive is added, the thickness expansion rate after storage at a high temperature of 85° C. is relatively high, and the number of cycles counted when the 45° C. discharge capacity drops to 80% is reduced.

As can be seen from the data in Embodiments 10 and 15, the conductivity of the electrolyte solution affects the high-temperature cycle performance of the lithium-ion battery. In Embodiment 15, the conductivity of the electrolyte solution is less than 7 ms/cm, and therefore, the number of cycles counted when the 45° C. discharge capacity drops to 80% is reduced.

As can be seen from the data in Embodiment 10 and Embodiments 16 to 17, the thickness of the positive film layer and the thickness of the positive current collector affect the appearance of the electrode plate and the high-temperature cycle performance. As can be seen from the data in Embodiments 10, 16, 18, and 19, the compaction density of the positive film layer affects the high-temperature storage performance and high-temperature cycle performance of the lithium-ion battery.

As can be seen from the data in Embodiment 28 and Embodiments 35 to 36, the particle diameter $Dv_{99}$ of the positive active material affects the high-temperature cycle performance of the lithium-ion battery. When the particle diameter $Dv_{99}$ of the positive active material is less than 5 μm or greater than 48 μm, the number of cycles counted when the 45° C. discharge capacity drops to 80% is reduced.

What is claimed is:

1. An electrochemical device, comprising a positive electrode, wherein the positive electrode comprises a current collector and a film layer containing a positive active material, the film layer is disposed on at least one surface of the current collector, and the positive active material comprises a primary particle;

wherein 20%≤A≤100%, $D_l-(Dv_{99}-D_c)\geq 0.8$ μm,

A is a mass percent of the primary particle in the positive active material based on a mass of the positive active material; wherein $D_l$ is a thickness of the film layer, De is a thickness of the current collector, and $Dv_{99}$ is a diameter of particles of the positive active material corresponding to a point at which a cumulative volume percentage of measured particles reaches 99% of a total volume of all sample particles in a volume-based particle size distribution curve viewed from a small-diameter side;

wherein $D_l$, $D_c$, and $Dv_{99}$ are measured in μm; and the electrochemical device further comprises an electrolyte solution, and the electrolyte solution comprises an ether dinitrile compound; and based on a total mass of the electrolyte solution, a mass percent of the ether dinitrile compound is 0.01 wt % to 15 wt %.

2. The electrochemical device according to claim 1, wherein $D_l-(Dv_{99}-D_c)\geq 1.8$ μm.

3. The electrochemical device according to claim 1, wherein $D_l-(Dv_{99}-D_c)\geq 5$ μm.

4. The electrochemical device according to claim 1, wherein $D_l-(Dv_{99}-D_c)\geq 8.7$ μm.

5. The electrochemical device according to claim 1, wherein $0.05\leq D_l/D_c\leq 3.75$.

6. The electrochemical device according to claim 1, wherein $1.08\leq D_l/D_c\leq 2.96$.

7. The electrochemical device according to claim 1, wherein the thickness $D_l$ of the film layer is 1 μm to 30 μm.

8. The electrochemical device according to claim 1, wherein the thickness $D_l$ of the film layer is 14.1 μm to 29.6 μm.

9. The electrochemical device according to claim 1, wherein the thickness De of the current collector is 4 μm to 20 μm.

10. The electrochemical device according to claim 1, wherein the particle diameter $Dv_{99}$ of the positive active material is 5 μm to 48 μm.

11. The electrochemical device according to claim 1, wherein a compaction density of the film layer is 2 g/cm$^3$ to 4.3 g/cm$^3$.

12. The electrochemical device according to claim 1, wherein the current collector comprises a blank region and a covered region;

the blank region is a region not covered with the film layer on the current collector, and a roughness parameter, expressed as peak density (RPc), of the blank region is 500 mm-1 to 2000 mm$^{-1}$; and the covered region is a region covered with the film layer on the current collector, and a roughness parameter, expressed as peak density (RPc), of the covered region is 1500 mm$^{-1}$ to 8000 mm$^{-1}$.

13. The electrochemical device according to claim 1, wherein a conductivity of the electrolyte solution is greater than or equal to 7 mS/cm.

14. An electronic device, comprising an electrochemical device, the electrochemical device comprises a positive electrode, wherein the positive electrode comprises a current collector and a film layer containing a positive active material, the film layer is disposed on at least one surface of the current collector, and the positive active material comprises a primary particle;

wherein 20%≤A≤100%, $D_l \geq Dv_{99} - D_c$,

A is a mass percent of the primary particle in the positive active material based on a mass of the positive active material; wherein $D_l$ is a thickness of the film layer, De is a thickness of the current collector, and $Dv_{99}$ is a diameter of particles of the positive active material corresponding to a point at which a cumulative volume percentage of measured particles reaches 99% of a total volume of all sample particles in a volume-based particle size distribution curve viewed from a small-diameter side;

wherein $D_l$, $D_c$, and $Dv_{99}$ are measured in μm; and the electrochemical device further comprises an electrolyte solution, and the electrolyte solution comprises an ether dinitrile compound; and based on a total mass of the electrolyte solution, a mass percent of the ether dinitrile compound is 0.01 wt % to 15 wt %.

15. The electronic device according to claim 14, wherein $0.05 \leq D_l/D_c \leq 3.75$.

16. The electronic device according to claim 14, wherein the thickness $D_l$ of the film layer is 1 μm to 30 μm.

17. The electronic device according to claim 14, wherein the thickness $D_l$ of the film layer is 14.1 μm to 29.6 μm.

18. The electronic device according to claim 14, wherein the particle diameter $Dv_{99}$ of the positive active material is 5 μm to 48 μm.

19. The electronic device according to claim 14, wherein the current collector comprises a blank region and a covered region;

the blank region is a region not covered with the film layer on the current collector, and a roughness parameter, expressed as peak density (RPc), of the blank region is 500 mm$^{-1}$ to 2000 mm$^{-1}$; and the covered region is a region covered with the film layer on the current collector, and a roughness parameter, expressed as peak density (RPc), of the covered region is 1500 mm$^{-1}$ to 8000 mm$^{-1}$.

* * * * *